(12) United States Patent
Akami

(10) Patent No.: US 8,337,355 B2
(45) Date of Patent: Dec. 25, 2012

(54) ECCENTRIC SPEED REDUCER

(75) Inventor: Toshiya Akami, Gifu (JP)

(73) Assignee: Nabtesco Corporation (JP)

( * ) Notice: Subject to any disclaimer, the term of this patent is extended or adjusted under 35 U.S.C. 154(b) by 301 days.

(21) Appl. No.: 12/920,009

(22) PCT Filed: Mar. 3, 2008

(86) PCT No.: PCT/JP2008/000426
§ 371 (c)(1),
(2), (4) Date: Aug. 27, 2010

(87) PCT Pub. No.: WO2009/110023
PCT Pub. Date: Sep. 11, 2009

(65) Prior Publication Data
US 2011/0009224 A1    Jan. 13, 2011

(51) Int. Cl.
*F16H 1/32* (2006.01)
(52) U.S. Cl. ..................... 475/168
(58) Field of Classification Search .......... None
See application file for complete search history.

(56) References Cited

U.S. PATENT DOCUMENTS

| | | | |
|---|---|---|---|
| 6,679,801 B2 * | 1/2004 | Nohara et al. | 475/179 |
| 7,553,249 B2 * | 6/2009 | Nohara | 475/170 |
| 7,811,193 B2 * | 10/2010 | Nakamura | 475/179 |
| 8,022,564 B2 * | 9/2011 | Nohara et al. | 290/44 |
| 2011/0015023 A1 * | 1/2011 | Akami | 475/162 |

FOREIGN PATENT DOCUMENTS

| | | |
|---|---|---|
| JP | 63-103035 U | 7/1988 |
| JP | 2003-083400 A | 3/2003 |
| JP | 2005-330981 A | 12/2005 |

OTHER PUBLICATIONS

International Search Report; PCT/JP2008/000426; Jun. 3, 2008.

* cited by examiner

*Primary Examiner* — Dirk Wright
(74) *Attorney, Agent, or Firm* — Studebaker & Brackett PC; Donald R. Studebaker

(57) ABSTRACT

There is provided an eccentric speed reducer that achieves improved output torque without increasing the outer radial dimension of a casing. The strut includes, at the basal portion of a peripheral side surface where the strut is continuous with the base carrier, first curved portions and second curved portions that are in a form of a curved surface having a different radius of curvature. The first curved portions are provided at the supporting hole-facing sides of the strut that are disposed facing the rotation supporting holes. The second curved portions are provided between an outer side located in the strut at an outer position in the radial direction of the casing and on the side facing the inner circumference of the casing, and supporting hole-facing sides. The second curved portions have a larger radius of curvature than the first curved portions.

4 Claims, 7 Drawing Sheets

ECCENTRIC SPEED REDUCER

TECHNICAL FIELD

The present invention relates to an eccentric speed reducer that includes crankshafts, external gears that are eccentrically rotated by rotation of the crankshafts, a casing provided with internal teeth for meshing with external teeth of the external gears, and a carrier that rotatably supports the crankshafts.

BACKGROUND ART

In various industrial machines and the like, eccentric speed reducers are used as speed reducers capable of achieving a high speed reduction ratio. Such eccentric speed reducers include crankshafts, external gears that are eccentrically rotated by rotation of the crankshafts, a casing provided with internal teeth for meshing with external teeth of the external gears, and a carrier that rotatably supports the crankshafts, and an eccentric speed reducer as described in Patent Document 1 is known. In the eccentric speed reducer described in Patent Document 1, a carrier that rotatably supports a plurality of crankshafts is made up of a base carrier (base portion) that rotatably supports one end of each of the crankshafts and an end carrier (end plate portion) that rotatably supports the other end. The base carrier is integrally formed with a plurality of struts (column portions) extending from the base carrier toward the end carrier and connecting the base carrier and the end carrier.

Patent Document 1: JP2003-83400A (page 3, FIG. 1, FIG. 2)

DISCLOSURE OF INVENTION

Problem to be Solved by the Invention

It is desirable for eccentric speed reducers to be small in size and be able to achieve a high output, and there is a need to achieve improved output torque without increasing the outer radial dimensions of the casing (the outer dimensions of the casing in the radial direction with respect to the inner circumference of the casing). In order to achieve improved output torque (increased output), it is necessary to improve the strength of each of the struts that connects the base carrier and the end carrier that rotatably support the crankshafts. However, since each of the struts is disposed so as to pass through a hole formed in the external gear provided with the external teeth for meshing with the internal teeth on the inner circumference of the casing, it is necessary that each of the struts is disposed in a further outer position in the radial direction of the casing in order to improve the strength of each of the struts based on the structure disclosed in Patent Document 1. For this reason, the eccentric speed reducer described in Patent Document 1 has a problem in that the strength of the struts is limited depending on the radial dimension of the casing, and so it is difficult to achieve improved output torque without increasing the radial dimension of the casing.

In view of the foregoing circumstances, it is an object of the present invention to provide an eccentric speed reducer that achieves improved output torque without increasing the outer radial dimension of a casing.

Means for Solving Problem

An eccentric speed reducer according to a first aspect of the present invention includes: a casing having internal teeth provided on an inner circumference thereof; an external gear housed in the casing and having external teeth provided on an outer circumference thereof for meshing with the internal teeth; a plurality of crankshafts passing through holes provided in the external gear and disposed in a circumferential direction along the inner circumference of the casing, the crankshafts configured to rotate to allow the external gear to eccentrically rotate; a base carrier having a rotation supporting hole for rotatably supporting one end of the crankshafts; an end carrier that rotatably supports the other end of the crankshafts; and a plurality of struts each disposed between the crankshafts in a circumferential direction along the inner circumference of the casing and formed integrally with the base carrier, the struts connecting the base carrier and the end carrier. Also in the eccentric speed reducer of the first aspect of the present invention, the struts includes, at a basal portion of a peripheral side surface where the struts are continuous with the base carrier, a first curved portion and a second curved portion being in a form of a curved surface having a different radius of curvature and each being continuous with the base carrier, the first curved portion is provided at a supporting hole-facing side of the struts disposed facing the rotation supporting hole, the second curved portion is provided between an outer side and the supporting hole-facing side, the outer side being located in the struts at an outer position in a radial direction with respect to the inner circumference of the casing and on a side facing the inner circumference of the casing, and the second curved portion has a larger radius of curvature than the first curved portion.

According to this aspect of the present invention, the strut includes, at the basal portion of the side surface that is continuous with the base carrier, the first curved portion and the second curved portion having a larger radius of curvature than the first curved portion. The first curved portion is provided at the supporting hole-facing side, while the second curved portion is provided between the outer side and the supporting hole-facing side. Thus the second curved portion having a large radius of curvature is provided at a portion where a force exerted in the circumferential direction of the casing (the circumferential direction along the inner circumference of the casing) is likely to be exerted, that is, at the basal portion that is continuous with the base carrier between the outer side and the supporting hole-facing side in the strut. In contrast, the first curved portion having a small radius of curvature is provided at the basal portion of the supporting hole-facing side, adjacent to the second curved portion. Consequently, undue concentration of the force exerted in the circumferential direction of the casing on the second curved portion is suppressed, as the force can be dispersed also into the first curved portion. This reduces the difference in burden of the load in the circumferential direction of the casing between the first curved portion and the second curved portion, allowing for efficient dispersion of the burden for support into the first curved portion and the second curved portion. Thus the load is efficiently dispersed in the whole side surface of the struts, which achieves increased strength of the struts as a whole.

Accordingly, the aspect of the present invention provides an eccentric speed reducer that achieves improved output torque without increasing the outer radial dimension of the casing.

An eccentric speed reducer according to a second aspect of the present invention is the eccentric speed reducer according to the first aspect of the present invention, wherein the supporting hole-facing side having the first curved portion is disposed along the rotation supporting hole, the outer side is disposed in the circumferential direction along the inner circumference of the casing, and the second curved portion is provided at a bulging portion located in the struts at an outer position in the radial direction with respect to the inner circumference of the casing and bulging in the circumferential direction along the inner circumference of the casing.

According to this aspect of the present invention, the second curved portion having a large radius of curvature is provided at the bulging portion on which a force exerted in the circumferential direction of the casing is particularly likely to be exerted in the strut. Thus undue concentration of a load on the basal portion of the bulging portion on which a force exerted in the circumferential direction of the casing is likely to be exerted is suppressed, and the load is more efficiently dispersed for support in the struts. Consequently, increased strength of the struts as a whole is more efficiently achieved.

An eccentric speed reducer according to a third aspect of the present invention is the eccentric speed reducer according to the second aspect of the present invention, wherein the second curved portion is provided at the bulging portion on the side of the rotation supporting hole facing the bulging portion with respect to a tangent that is in contact with a peripheral edge of the rotation supporting hole and that passes through the center of the inner circumference of the casing.

According to this aspect of the present invention, the second curved portion is provided at the bulging portion on the side of the rotation supporting hole with respect to the tangent that is in contact with the peripheral edge of the rotation supporting hole and that passes through the center of the inner circumference of the casing. Thus the second curved portion having a large radius of curvature is provided in a portion where a force exerted in the circumferential direction of the casing is very likely to be exerted, that is, the basal portion in the bulging portion that is on the side of the rotation supporting hole with respect to the above-described tangent and is continuous with the base carrier. Consequently, the load is even more efficiently dispersed for support in the struts, and increased strength of the struts as a whole is even more efficiently achieved. Furthermore, the portion on the side of the rotation supporting hole with respect to the above-described tangent in the bulging portion of the struts is conventionally a dead space and does not expand in the radial direction of the casing, and therefore, a large radius of curvature of the second curved portion also achieves effective utilization of a space without expanding in the radial direction of the casing.

An eccentric speed reducer according to a fourth aspect of the present invention is the eccentric speed reducer according to the first aspect of the present invention, wherein the external gear has a strut hole for the struts to pass through and a cut portion in a position facing the second curved portion of the struts via the strut hole.

According to this aspect of the present invention, the external gear is provided with the cut portion in a position facing the second curved portion via the strut hole, which realizes an even larger radius of curvature of the second curved portion without interference between the struts and the external gear. Thus concentration of a load on the second curved portion is suppressed, so that the load is efficiently dispersed in the whole side surface of the struts, which achieves further increased strength of the struts as a whole. Furthermore, the cut portion provided only at a limited portion of the external gear that faces the second curved portion hardly affects the strength of the external gear, and therefore the strength of the external gear is maintained.

Effects of the Invention

The present invention provides an eccentric speed reducer that achieves improved output torque without increasing the outer radial dimension of a casing.

BRIEF DESCRIPTION OF DRAWINGS

FIG. 1 is a cross-sectional view of an eccentric speed reducer according to one embodiment of the present invention.
FIG. 2 is a cross-sectional view as viewed in the direction of arrows A-A in FIG. 1
[FIG. 3]
FIG. 4 is a diagram showing an enlarged view of a strut shown in FIG. 3.
FIG. 5 is a diagram showing the base carrier, the strut, and an external gear shown in FIG. 3 as viewed from the direction of arrow C, including a partially cut-out cross-section as viewed from the position of arrows D-D.
FIG. 6 is a diagram showing the base carrier, the strut, and the external gear shown in FIG. 3 as viewed from the direction of arrow C, including a partially cut-out cross-section as viewed from the position of arrows E-E.
FIG. 7 is a diagram showing the base carrier, the strut, and the external gear shown in FIG. 3 in a different operating state from FIG. 6, including a partially cut-out cross-section as viewed from the position of arrows E-E.

DESCRIPTIONS OF REFERENCE NUMERALS

Figure 1:
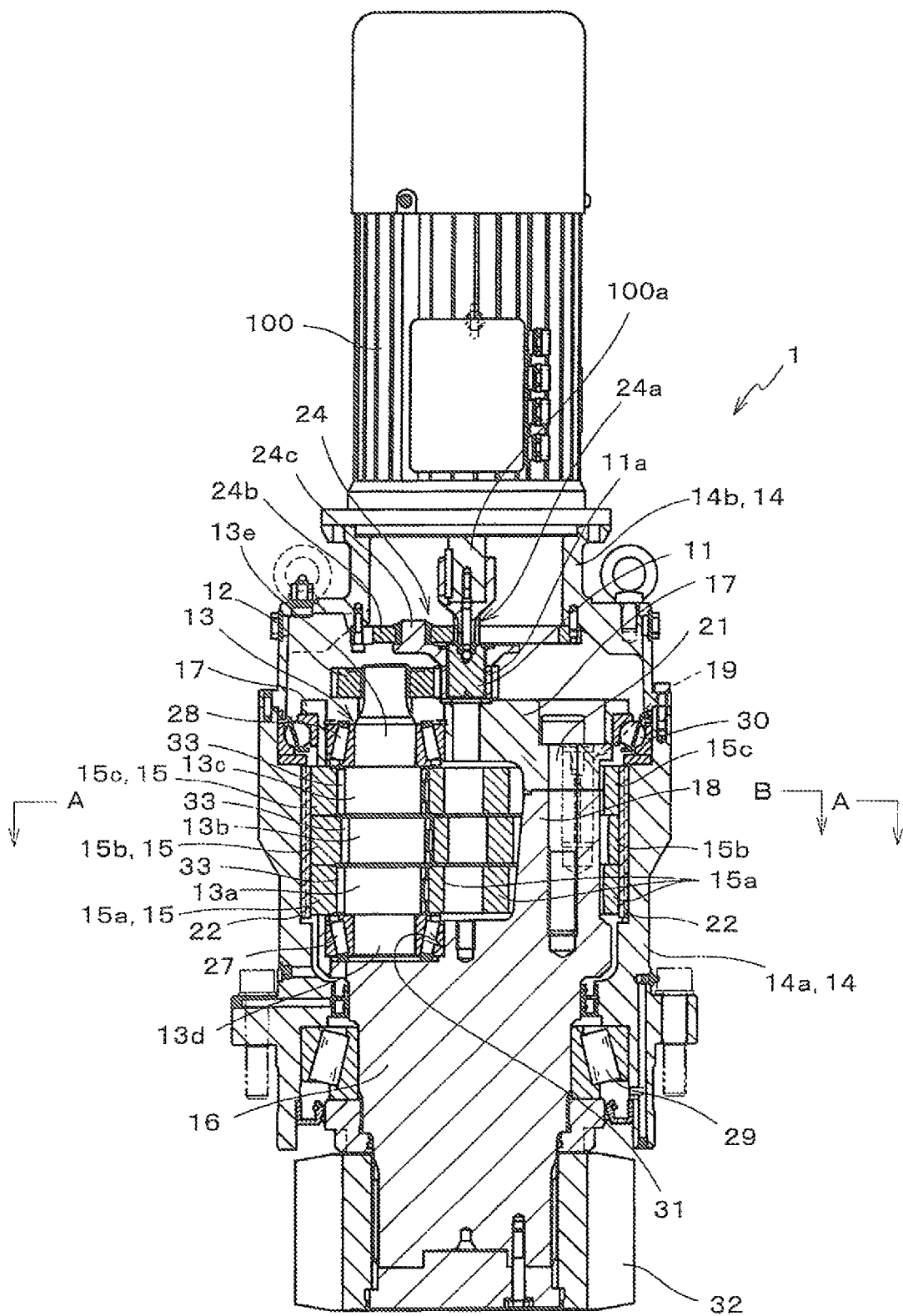
[FIG. 1]

1 Eccentric speed reducer
13 Crankshaft
14 Casing
15 External gear
16 Base carrier
17 End carrier
18 Strut
22 Internal teeth
23 External teeth
35 Bulging portion side
36 Supporting hole-facing side
37 Bulging portion
38 First curved portion
39 Second curved portion
42 Outer side

BEST MODE FOR CARRYING OUT THE INVENTION

Hereinafter, an embodiment for carrying out the present invention is described with reference to the drawings. An eccentric speed reducer according to an embodiment of the present invention is applicable widely in a variety of industrial machines such as industrial robots and various machine tools, and construction machines. In windmills, for example, with the recent trend that the diameter of blades is increasing, there is a need for a speed reducer having high output specifications (having a large load carrying capacity) without an increase in dimensions, as a yaw drive apparatus, which is an oscillating driving apparatus for rotating a windmill according to the wind direction. For this reason, an eccentric speed reducer according to this embodiment is suitably used as such a yaw drive apparatus of a windmill. Furthermore, without being limited to this example, the present invention can be widely applied to an eccentric speed reducer that includes crankshafts, external gears that are eccentrically rotated by rotation of the crankshafts, a casing provided with internal teeth for meshing with external teeth of the external gears, and a carrier that rotatably supports the crankshafts.

FIG. 1 is a cross-sectional view showing an eccentric speed reducer 1 according to one embodiment of the present invention. The eccentric speed reducer 1 is used, for example, as a yaw drive apparatus of a windmill, and decelerates, or reduce the speed of, rotation that is input from a motor 100 disposed on the upper side, and transmits and outputs the decelerated rotation, as shown in FIG. 1. The eccentric speed reducer 1 includes an input shaft 11, spur gears 12, crankshafts 13, a casing 14, external gears 15, a base carrier 16, an end carrier 17, struts 18, pin members (19, 20) (see FIG. 2), bolt members 21, and so forth.

Figure 2:
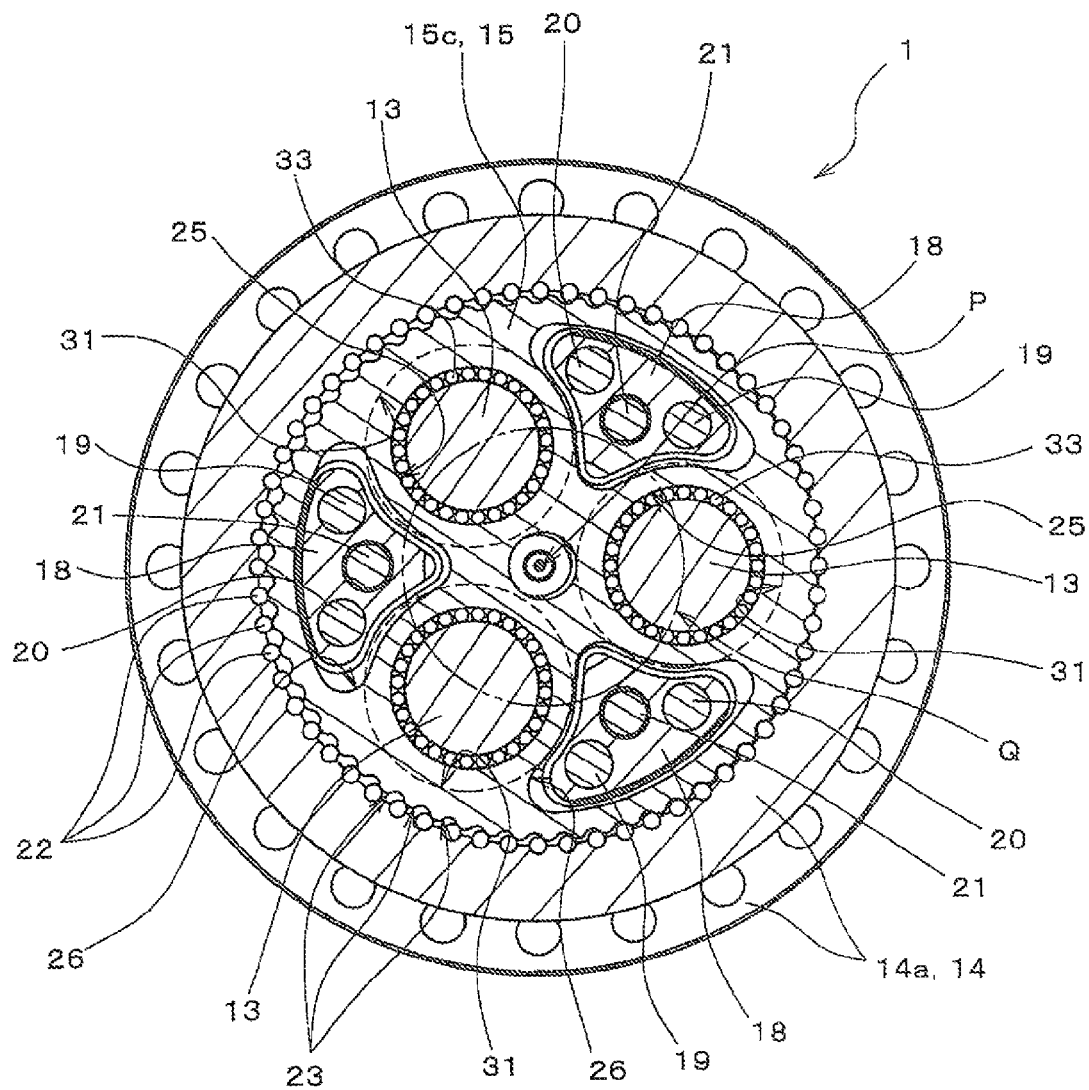
[FIG. 2]

The casing 14 is made up of a first casing portion 14a and a second casing portion 14b that are tubular, and the edges thereof are connected to each other with bolts. Housed inside the casing 14 are the input shaft 11, the spur gears 12, the crankshafts 13, the external gears 15, part of the base carrier 16, the end carrier 17, and so forth. The casing 14 has an opening at one end serving as the output end (the end of the first casing portion 14a), and the motor 100 is fixed at the other end serving as the input end (the end of the second casing portion 14b). Furthermore, as shown in FIG. 1 and FIG. 2, which is a cross-sectional view as viewed in the direction of arrows A-A in FIG. 1, the casing 14 has internal teeth 22 provided on its inner circumference. The internal teeth 22 are provided as pin-shaped members (round-bar-shaped members) for meshing with below-described external teeth 23 provided on the external gear 15. The internal teeth 22 are each arranged on the inner circumference of the casing 14 in equal pitches, being fitted into the casing 14.

The input shaft 11 receives input of rotational driving force from a motor output shaft 100a of the motor 100 via a planetary gear mechanism 24 and thus is linked to the motor 100. More specifically, a sun gear 24a of the planetary gear mechanism 24 is connected to the motor output shaft 100a protruding into the casing 14 from the motor 100 attached to the other end of the casing 14. The input shaft 11 is then spline-coupled to the inner circumference portion of a planet carrier 24c that rotatably supports a plurality of planet gears 24b for meshing with the sun gear 24a and moves in a revolving manner. Thus, rotational driving force from the motor 100 is decelerated via the planetary gear mechanism 24 and transmitted to the input shaft 11. Furthermore, the input shaft 11 is disposed at the center in the radial direction with respect to the inner circumference of the casing 14 (hereinafter, referred to as "the radial direction of the casing 14"), and a ring gear 11a is spline-coupled to the outer circumference on one end of the input shaft 11 that is opposite from the other end (the motor 100 side) on which the input shaft 11 is spline-coupled to the planet carrier 24c.

A plurality of (three, in this embodiment) spur gears 12 is arranged around the input shaft 11 and in the circumferential direction thereof. Each of the spur gears 12 is configured to mesh with the ring gear 11a coupled to the input shaft 11. Consequently, rotational driving force from the motor 100 causes the input shaft 11 to rotate, and this rotation causes the spur gears 12 to be rotationally driven.

The spur gears 12 are fixed to the crankshafts 13 at an end of the crankshafts 13 that is on the motor 100 side, and the crankshafts 13 are provided as a member for eccentrically rotating below-described external gears 15 by rotating along with the spur gears 12. As shown in FIGS. 1 and 2, a plurality of (three, in this embodiment) crankshafts 13 passes through crankshaft holes 25 formed in the external gears 15 and is disposed in the circumferential direction along the inner circumference of the casing 14, extending parallel to the input shaft 11. More specifically, as clearly shown in FIG. 2, the three crankshafts 13 are disposed in the circumferential direction of a predetermined circle Q (indicated by the chain double-dashed line in FIG. 2) centering on a casing center P (indicated by the dot in FIG. 2), which is the center of the inner circumference of the casing 14.

Furthermore, as clearly shown in FIG. 1, each of the crankshafts 13 includes a first cam portion 13a, a second cam portion 13b, a third cam portion 13c, a first shaft portion 13d, and a second shaft portion 13e, which are disposed in series in the order of the first shaft portion 13d, the first cam portion 13a, the second cam portion 13b, the third cam portion 13c, and the second shaft portion 13e. The first to third cam portions (13a to 13c) have a circular cross section perpendicular to the axial direction, and are provided such that the location of their centers is eccentric with respect to the shaft center of the crankshaft 13 (the location of the centers of the first shaft portion 13d and the second shaft portion 13e). Furthermore, the first shaft portion 13d is rotatably supported with respect to a below-described base carrier 16 via a roller bearing 27, and the second shaft portion 13e is rotatably supported with respect to a below-described end carrier 17 via a roller bearing 28. In addition, an end portion of the second shaft portion 13e of each of the crankshafts 13 is spline-coupled to each of the spur gears 12.

As clearly shown in FIG. 1, the base carrier 16 has one end serving as the output end protruding from the opening of the casing 14, and an output gear 32 is attached to that end. Furthermore, the base carrier 16 is housed in the casing 14 with its other end being connected to the end carrier 17 via the struts 18, the pin members (19, 20) and the bolt members 21, constituting the output shaft of the eccentric speed reducer 1. The output shaft including the base carrier 16 and the end carrier 17 is rotatably supported with respect to the casing 14 via a roller bearing 29 on the output side and a ball bearing 30 on the motor 100 side that are arranged along the inner circumference of the casing 14. Furthermore, the base carrier 16 is provided with rotation supporting holes 31 for rotatably supporting one end of each of the crankshafts 13 at the first shaft portion 13d via the roller bearing 27. In FIG. 2, the rotation supporting holes 31 are indicated by broken lines.

Furthermore, the end carrier 17 connected to the other end of the base carrier 16 is provided as a disc-shaped member, and has through-holes for the second shaft portion 13e of the crankshafts 13 to pass through. With the through-holes, the end carrier 17 rotatably supports the other end of the crankshafts 13 at the second shaft portion 13e via the roller bearing 28.

As shown in FIGS. 1 and 2, the external gears 15 include a first external gear 15a, a second external gear 15b, and a third external gear 15c that are housed in the casing 14 being stacked in parallel to one another. Each of the first to third external gears (15a to 15c) has the crankshaft holes 25 for the crankshafts 13 to pass through and below-described strut holes 26 for the struts 18 to pass through. The first to third external gears (15a to 15c) are disposed such that, in a direction parallel to the axial direction of the input shaft 11, the positions of the crankshaft holes 25 correspond to one another and the positions of the strut holes 26 correspond to one another. As the crankshaft holes 25, three circular holes respectively corresponding to the crankshafts 13 are provided at an equal angle in the circumferential direction of the external gears 15. Each of the crankshaft holes 25 supports, via a needle bearing 33, the first cam portion 13a at the first external gear 15a, the second cam portion 13b at the second external gear 15b, and the third cam portion 13c at the third external gear 15c. As the strut holes 26, three holes having a triangular cross section and an inner peripheral wall of an arc surface and respectively corresponding to the struts 18 are provided at an equal angle in the circumferential direction of the external gears 15. More specifically, the strut holes 26 and the crankshaft holes 25 are disposed alternately in the circumferential direction of the external gears 15. The struts 18 respectively pass through the strut holes 26 in a loosely fitted state. Furthermore, as described below, the external gears 15 are provided with cut portions 34 in a position facing a predetermined portion of the basal portion of the struts 18 that is continuous with the base carrier 16, the cut portions 34 being made in such a manner that part of an edge portion of the strut holes 26 is cut so as to be beveled somewhat largely (see FIG. 6).

Due to the above-described arrangement of the external gears 15 and the crankshafts 13, when the crankshafts 13 are rotated by rotational driving force transmitted from the input shaft 11 via the spur gears 12, a load is exerted via the first to third cam portions (13a to 13c) upon the external gears 15 along with the rotation of the crankshafts 13. This load will cause the external gears 15 (the first external gear 15a, the second external gear 15b, and the third external gear 15c) to oscillate.

Furthermore, each of the first external gear 15a, the second external gear 15b, and the third external gear 15c is provided with external teeth 23 on the outer circumference thereof for meshing with the internal teeth 22. The number of external teeth 23 of the external gears 15 (15a to 15c) is one less than the number of internal teeth 22. Accordingly, each time the crankshafts 13 are rotated, the meshing between the external teeth 23 and the internal teeth 22 is shifted, which causes the external gears 15 (the first external gear 15a, the second external gear 15b, the third external gear 15c) to be eccentric and to rotate in oscillation.

Figure 3:
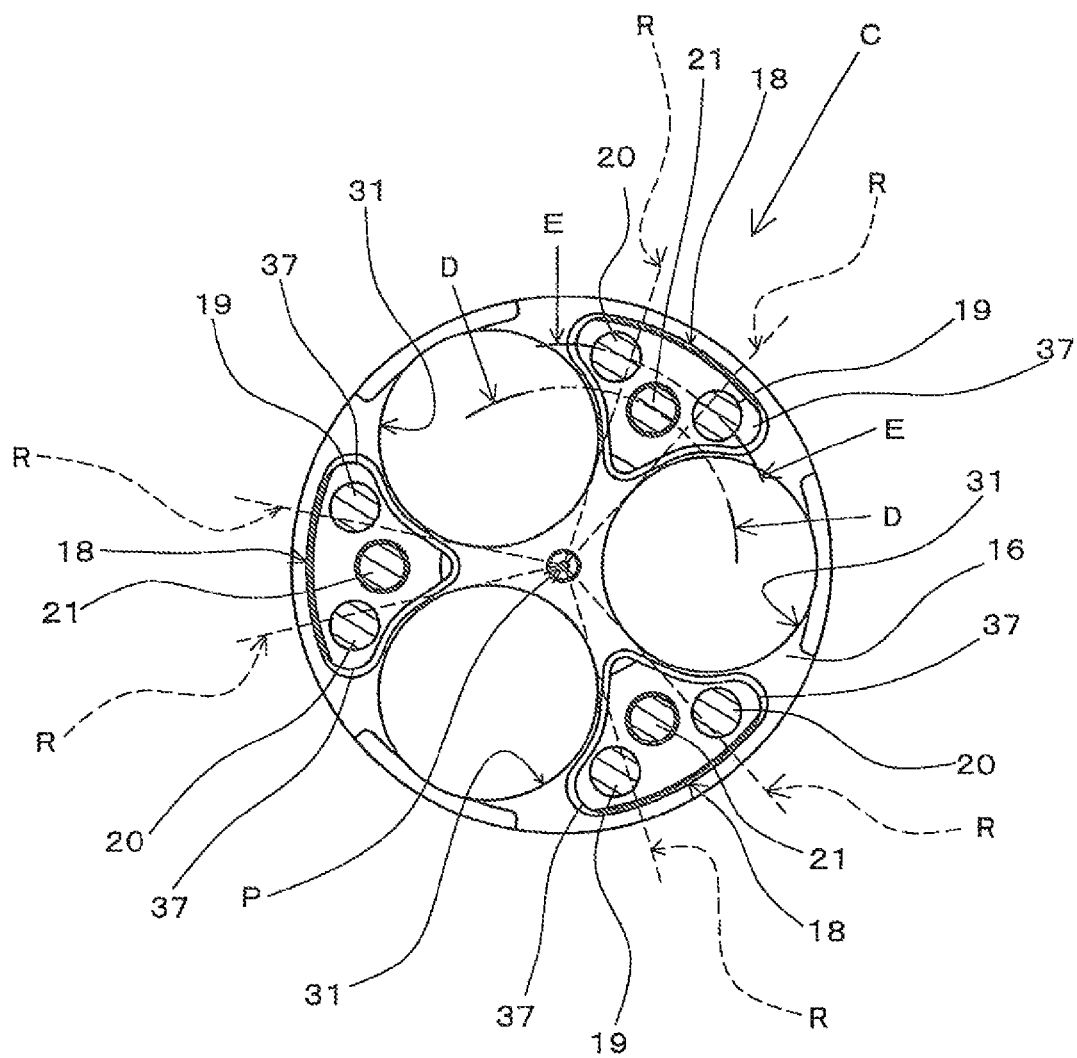
FIG. 3 is a diagram showing a base carrier and struts as viewed from the position of arrow B in FIG. 1.

Following is a detailed description of the configuration of the struts 18. FIG. 3 is a diagram showing the base carrier 16 and the struts 18 together with a cross sectional view of the pin members (19, 20) and the bolt members 21, as viewed from the position of arrow B in FIG. 1. As shown in FIGS. 1 to 3, each of the struts 18 is disposed between the crankshafts 13 in the circumferential direction along the inner circumference of the casing 14 (the circumferential direction of the circle Q shown in FIG. 2). A plurality of (three, in this embodiment) struts 18 is disposed at an equal angle in the circumferential direction along the inner circumference of the casing 14 (hereinafter, referred to as "the circumferential direction of the casing 14"). Each of the struts 18 is formed integrally with the base carrier 16, and provided so as to protrude toward the other end of the base carrier 16 (the motor 100 side). The base carrier 16 and the end carrier 17 are connected via these struts 18.

Figure 4:
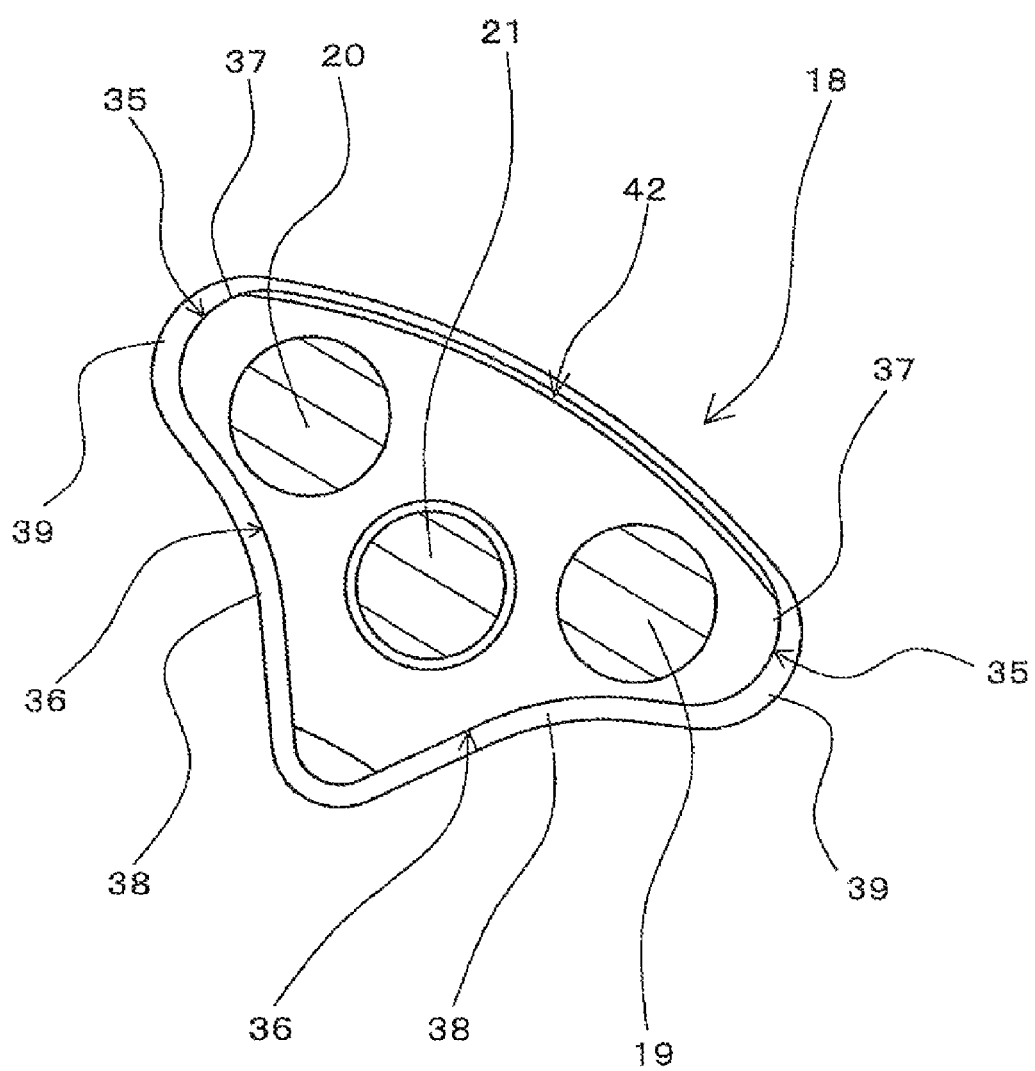
[FIG. 4]

As shown in FIGS. 1 to 3, the struts 18 each have a triangular cross section perpendicular to the longitudinal direction of the struts 18 (the direction in which the struts 18 extend from the base carrier 16 toward the end carrier 17) in which a peripheral side surface is formed by circular arc-shaped sides having a large radius of curvature being continuous via a circular arc-shaped sides having a small radius of curvature therebetween. FIG. 4 is a diagram showing an enlarged view of only one of the struts 18 shown in FIG. 3. As clearly shown in FIG. 4, the peripheral side surface of the strut 18 has sides such as an outer side 42, bulging portion sides 35, and supporting hole-facing sides 36. The outer side 42 is provided as a side that is located in the strut 18 at an outer position in the radial direction of the casing 14 and on the side opposite the inner circumference of the casing 14 (the side facing the inner circumference of the casing 14 with the external gears 15 therebetween) (see FIGS. 2 to 4). Furthermore, the outer side 42 is disposed in the circumferential direction of the casing 14. The bulging portion sides 35 of bulging portions 37 are provided as sides that are located in the strut 18 in an outer position in the radial direction of the casing 14 and bulges in the circumferential direction of the casing 14. The bulging portion sides 35 are disposed on the peripheral side surface of the strut 18 between the outer side 42 and the supporting hole-facing sides 36. Furthermore, the supporting hole-face sides 36 are provided as sides that are disposed facing the rotation supporting holes 31 and disposed so as to be circular arc-shaped along the rotation supporting holes 31 (See FIGS. 3 and 4).

Figure 5:
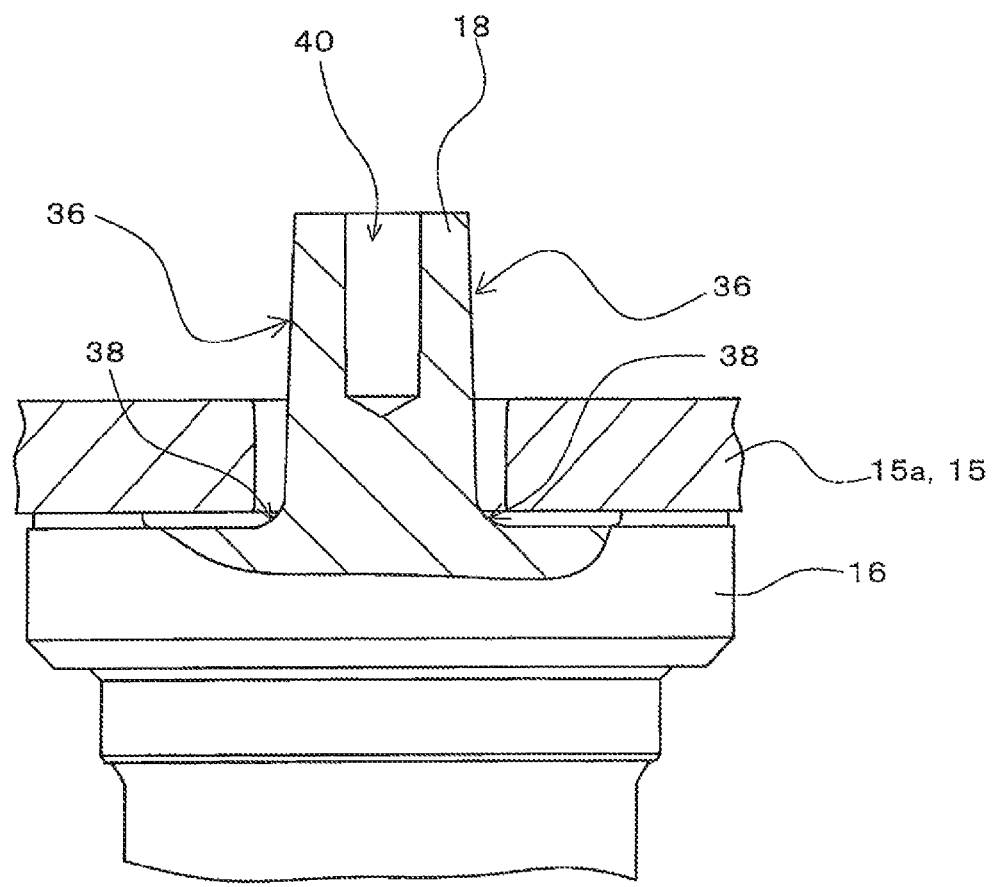
[FIG. 5]
Figure 6:
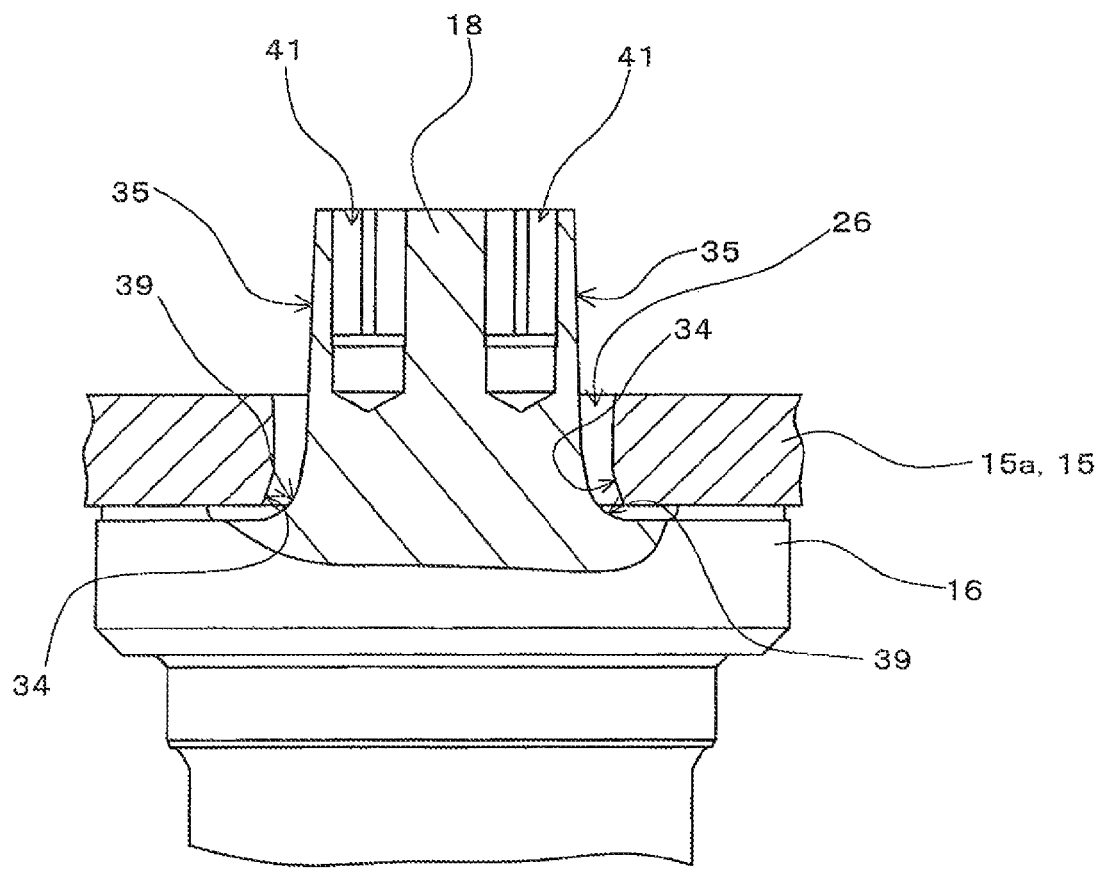
[FIG. 6]

FIGS. 5 and 6 are diagrams each showing the base carrier 16, the strut 18, and the first external gear 15a shown in FIG. 3 as viewed from the direction of arrow C, and show the strut 18 in a partially cut-out cross-sectional view. In FIGS. 5 and 6, only one strut 18 is illustrated and the other struts 18 are omitted. In FIG. 5, the illustrated strut 18 is shown as a cross section as viewed from the position of arrows D-D, which is a cross section in the circumferential direction of the casing 14, without the bolt member 21 disposed in a bolt hole 40. Furthermore, in FIG. 6, the illustrated strut 18 is shown as a cross section as viewed from the position of arrows E-E, which is a cross section in the circumferential direction of the casing 14, without the pin members (19, 20) disposed in pin holes 41.

As shown in FIGS. 4 to 6, the strut 18 includes, at the basal portion of the peripheral side surface where the strut 18 is continuous with the base carrier 16, first curved portions 38 and second curved portions 39 that are in a form of a curved surface having a different radius of curvature and are each continuous with the base carrier 16. More specifically, the first curved portions 38 and the second curved portions 39 are provided in a form of a curved surface having a different radius of curvature in a cross section parallel to the longitudinal direction of the strut 18 at the basal portion of the strut 18, each being continuous with the base carrier 16. The first curved portions 38 are provided at the basal portion of the supporting hole-facing sides 36. The second curved portions 39, in contrast, are provided at the basal portion of the bulging portion sides 35 of the peripheral side surface of the strut 18 between the outer side 42 and the supporting hole-facing sides 36. The second curved portions 39 are provided in the bulging portions 37 on the side of the rotation supporting hole 31 facing the bulging portions 37 with respect to a tangent R (indicated by the broken lines in FIG. 3) that is in contact with a peripheral edge of the rotation supporting hole 31 and that passes through the casing center P.

Furthermore, the second curved portions 39 have a larger radius of curvature than the first curved portions 38. For example, when the first curved portions 38 have a radius of curvature of 15 R (a radius of curvature of 15 mm), the second curved portions 39 have a radius of curvature of 25 R (a radius of curvature of 25 mm). In this way, setting the radius of curvature of the second curved portions 39 at a sufficiently large value, and furthermore, setting the radius of curvature of the second curved portions 39 larger than that of the first curved portions 38 allows a force exerted in the circumferential direction of the casing 14 to be efficiently dispersed for support into the first curved portions 38 and the second curved portions 39. As described for this embodiment, setting the ratio of the dimension of the radius of curvature of the first curved portions 38 to that of the second curved portions 39 at or near three fifths allows a load exerted in the circumferential direction of the casing 14 to be efficiently dispersed for support into the first curved portions 38 and the second curved portions 39. The load exerted in the circumferential direction of the casing 14, however, can be also sufficiently dispersed for support at another ratio.

Figure 7:
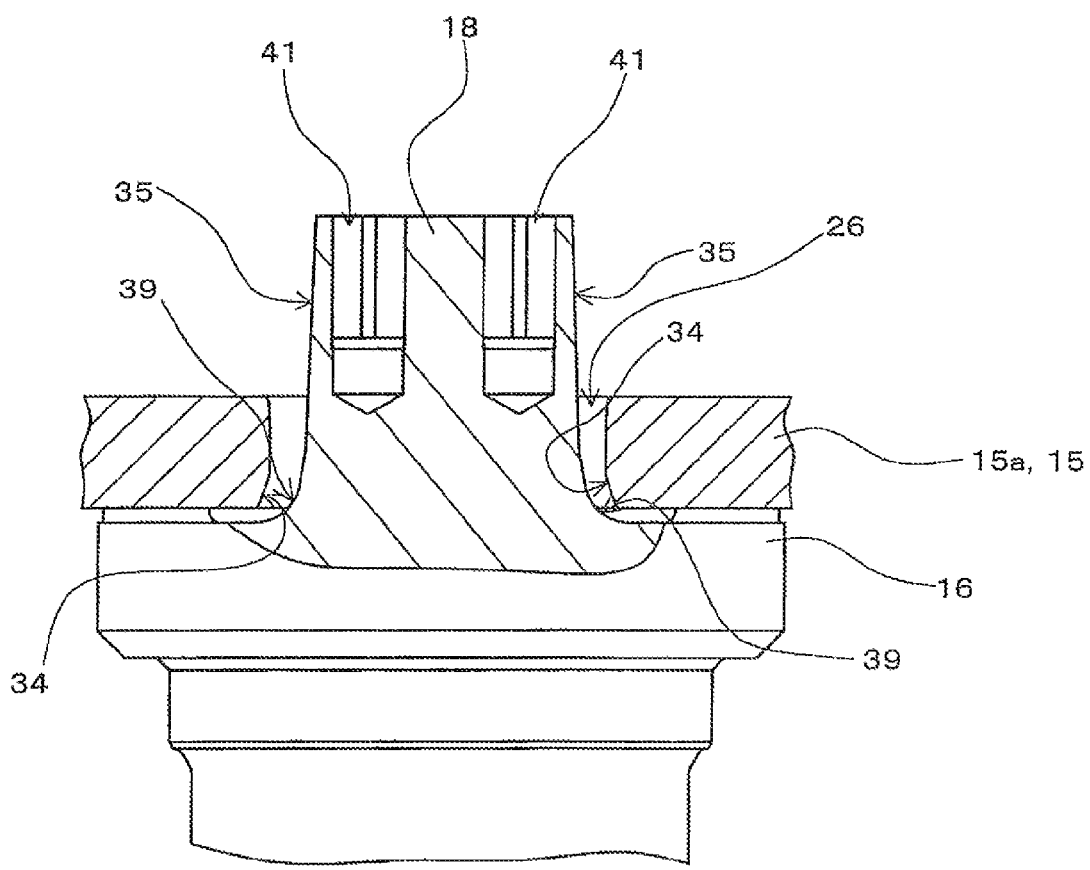
[FIG. 7]

Furthermore, as shown in FIG. 6, the first external gear 15a of the external gears 15 is provided with the cut portions 34 in a position facing the second curved portions 39 of the struts 18 via the strut holes 26. The cut portions 34, as described above, are provided such that part of the edge portion of the strut holes 26 is cut so as to be beveled in a planar or curved shape (for example, a curved shape that forms part of the curved side of a circular cone). FIG. 7 is a diagram showing a state in which the first external gear 15a has oscillated along with rotation of the crankshafts 13 from the state shown in FIG. 6, and the edge portion of the strut hole 26 and the second curved portion 39 have been brought close to each other. As shown in FIG. 7, providing the first external gear 15a with the cut portions 34 prevents the second curved portions 39 from interfering with the external gears 15 even if the dimension of the radius of curvature of the second curved portions 39 is large.

As shown in FIGS. 1 to 3, the pin members (19, 20) and the bolt members 21 are each provided as a connection member for connecting the base carrier 16 and the end carrier 17 with a portion thereof in the axial direction disposed within the struts 18. One end of each of the pin members (19, 20) is inserted into a hole in the struts 18, and the other end is inserted into a hole in the end carrier 17, both in a fitted state. In contrast, the bolt members 21 are each disposed such that a bolt shaft portion of the bolt members 21 passes through the through-hole in the end carrier 17 and a bolt head portion of the bolt members 21 locks against the end carrier 17. The bolt members 21 are each configured to screw, at an external thread portion at its tip, to the bolt hole 40 in the struts 18 having an internal thread portion on its inner circumference, thereby coupling the base carrier 17 and the end carrier 18 together.

In the eccentric speed reducer 1 having the above-described configuration, when the motor output shaft 100a rotates and rotational driving force from the motor 100 is transmitted via the planetary gear mechanism 24 to the input shaft 11, the input shaft 11 rotates and the plurality of spur gears 12 meshing with the ring gears 11a rotates. Along with the rotation of the spur gears 12, the plurality of crankshafts 13 rotates, and along with the crankshafts 13, the first cam portion 13a, the second cam portion 13b, and the third cam portion 13c rotate. With this rotation, the first external gear 15a, the second external gear 15b, and the third external gear 15c eccentrically rotate, while shifting the meshing with the internal teeth 22, as described above. With the eccentric rotation of the first to third external gears (15a to 15c), the crankshafts 13 that are rotatably held by the needle bearing 33 revolve around the casing center P. This causes rotation of the output shaft that includes the base carrier 16 and the end carrier 17 connected by the struts 18 having the first curved portions 38 and the second curved portions 39 and rotatably supports the crankshafts 13, whereby large torque is output from the output gear 32.

According to the eccentric speed reducer 1 described above, the struts 18 include, at the basal portion of the side surface that is continuous with the base carrier 16, the first curved portions 38 and the second curved portions 39 having a larger radius of curvature than the first curved portions 38. The first curved portions 38 are provided at the supporting hole-facing sides 36, while the second curved portions 39 are provided between the outer side 42 and the supporting hole-facing sides 36. Thus the second curved portions 39 having a large radius of curvature are provided at a portion where a force exerted in the circumferential direction of the casing 14 is likely to be exerted, that is, at the basal portion that is continuous with the base carrier 16 between the outer side 42 and the supporting hole-facing sides 36 in the strut 18. In contrast, the first curved portions 38 having a small radius of curvature are provided at the basal portion of the supporting hole-facing sides 36, adjacent to the second curved portions 39. Consequently, undue concentration of a force exerted in the circumferential direction of the casing 14 on the second curved portions 29 is suppressed, as the force can be dispersed also into the first curved portions 38. This reduces the difference in burden of the load in the circumferential direction of the casing 14 between the first curved portions 38 and the second curved portions 39, allowing for efficient dispersion of the burden for support into the first curved portions 38 and the second curved portions 39. Thus the load is efficiently dispersed in the whole side surface of the struts 18, which achieves increased strength of the struts 18 as a whole.

Accordingly, this embodiment provides an eccentric speed reducer 1 that achieves improved output torque without increasing the outer radial dimension of the casing 14.

Furthermore, in the eccentric speed reducer 1, the second curved portions 39 having a large radius of curvature is provided at the bulging portions 37 on which a force exerted in the circumferential direction of the casing 14 is particularly likely to be exerted in the struts 18. Thus undue concentration of a load on the basal portion of the bulging portions 37 on which a force exerted in the circumferential direction of the casing 14 is likely to be exerted is suppressed, and the load is more efficiently dispersed for support in the struts 18. Consequently, increased strength of the struts 18 as a whole is more efficiently achieved.

Furthermore, in the eccentric speed reducer 1, the second curved portions 39 are provided at the bulging portions 37 on the side of the rotation supporting holes 31 with respect to the tangent R that is in contact with the peripheral edge of the rotation supporting holes 31 and that passes through the center of the inner circumference of the casing. Thus the second curved portions 39 having a large radius of curvature are provided in a portion where a force exerted in the circumferential direction of the casing 14 is very likely to be exerted, that is, the basal portion in the bulging portions 37 that is on the side of the rotation supporting holes 31 with respect to the above-described tangent R and is continuous with the base carrier 16. Consequently, the load is even more efficiently dispersed for support in the struts 18, and increased strength of the struts 18 as a whole is even more efficiently achieved. Furthermore, the portion on the side of the rotation supporting holes 31 with respect to the above-described tangent R in the bulging portions 37 of the struts 18 is conventionally a dead space and does not expand in the radial direction of the casing 14, and therefore, a large radius of curvature of the second curved portions 39 also achieves effective utilization of a space without expanding in the radial direction of the casing 14.

Furthermore, in the eccentric speed reducer 1, the external gears 15 are provided with cut portions 34 in a position facing the second curved portions 39 via the strut holes 26, which realizes an even larger radius of curvature of the second curved portions 39 without interference between the struts 18 and the external gears 15. Thus concentration of a load on the second curved portions 39 is suppressed, so that the load is efficiently dispersed in the whole side surface of the struts 18, which achieves further increased strength of the struts 18 as a whole. Furthermore, the cut portions 34 provided only at a limited portion of the external gears 15 that faces the second curved portions 39 hardly affects the strength of the external gears 15, and therefore the strength of the external gears 15 is maintained.

Although an embodiment of the present invention is described above, the present invention is not limited to the above embodiment, and various modifications may be made within the scope recited in the claims. For example, the following modifications are possible.

(1) Although this embodiment is described taking, as an example, three components of external gears stacked on one other, this need not be the case; it is possible to adopt four or more components or two components of external gears stacked on one another. In such a case, the present invention may be carried out by adopting a configuration in which each of crankshafts is also provided with the number of cam portions corresponding to the number of external gears.

(2) Although this embodiment is described taking, as an example, a case where three crankshafts are provided, this need not be the case; the present invention may also be carried out with a configuration in which four or more crankshafts are provided.

(3) Although this embodiment was described taking, as an example, a configuration in which the internal teeth on the inner circumference of the casing are provided as a pin-shaped member, this need not be the case; the present invention may also be carried out with a configuration in which internal teeth integrally formed with the casing are provided, for example.

(4) Although in this embodiment, external gears provided with cut portions are described, this need not necessarily be the case; the advantages of the present invention may also be obtained as long as the second curved portions have a larger radius of curvature than the first curved portions.

(5) Although this embodiment is described taking, as an example, a case where the second curved portions are provided, at the bulging portions of the struts, on the side of the rotation supporting holes with respect to the tangent that is in contact with the peripheral edge of the rotation supporting holes and that passes through the center of the casing, this need not be the case. The second curved portions may be provided, at the bulging portions of the struts, on the opposite side from the rotation supporting holes with respect to the above-described tangent. Furthermore, the second curved portions may be provided at bulging portions of such a strut that has no portion in a position on the side of the rotation supporting holes with respect to the above-described tangent. Furthermore, the second curved portions may be provided between the outer side and the supporting hole-facing sides, in such a strut that has no bulging portion with the supporting hole-facing sides being flat instead of being curved along the rotation supporting holes. Furthermore, the second curved portions may be provided between the outer side and the supporting hole-facing sides, in such a strut that has no bulging portion with the outer side being flat instead of being curved in the circumferential direction along the inner circumference of the casing.

Industrial Applicability

The present invention is widely applicable as an eccentric speed reducer that includes crankshafts, external gears that are eccentrically rotated by rotation of the crankshafts, a casing provided with internal teeth for meshing with external teeth of the external gears, and a carrier that rotatably supports the crankshafts.

The invention claimed is:

1. An eccentric speed reducer comprising:
a casing having internal teeth provided on an inner circumference thereof;
an external gear housed in the casing and having external teeth provided on an outer circumference thereof for meshing with the internal teeth;
a plurality of crankshafts passing through holes provided in the external gear and disposed in a circumferential direction along the inner circumference of the casing, the crankshafts configured to rotate to allow the external gear to eccentrically rotate;
a base carrier having a rotation supporting hole for rotatably supporting one end of the crankshafts;
an end carrier that rotatably supports the other end of the crankshafts; and
a plurality of struts each disposed between the crankshafts in a circumferential direction along the inner circumference of the casing and formed integrally with the base carrier, the struts connecting the base carrier and the end carrier,
the struts including, at a basal portion of a peripheral side surface where the struts are continuous with the base carrier, a first curved portion and a second curved portion being in a form of a curved surface having a different radius of curvature and each being continuous with the base carrier,
the first curved portion provided at a supporting hole-facing side of the struts disposed facing the rotation supporting hole,
the second curved portion provided between an outer side and the supporting hole-facing side, the outer side being located in the struts at an outer position in a radial direction with respect to the inner circumference of the casing and on a side facing the inner circumference of the casing, and
the second curved portion having a larger radius of curvature than the first curved portion.

2. The eccentric speed reducer according to claim 1, wherein
the supporting hole-facing side having the first curved portion is disposed along the rotation supporting hole,
the outer side is disposed in the circumferential direction along the inner circumference of the casing, and
the second curved portion is provided at a bulging portion located in the struts at an outer position in the radial direction with respect to the inner circumference of the casing and bulging in the circumferential direction along the inner circumference of the casing.

3. The eccentric speed reducer according to claim 2, wherein
the second curved portion is provided at the bulging portion on the side of the rotation supporting hole facing the bulging portion with respect to a tangent that is in contact with a peripheral edge of the rotation supporting hole and that passes through the center of the inner circumference of the casing.

4. The eccentric speed reducer according to claim 1, wherein
the external gear has a strut hole for the struts to pass through and a cut portion in a position facing the second curved portion of the struts via the strut hole.

* * * * *